March 16, 1971 F. A. HOHLER ET AL 3,570,194
WORKHEAD
Filed Sept. 27, 1968 3 Sheets-Sheet 1

INVENTORS
FREDERICK A. HOHLER
RICHARD T. KNORRING
BY
*Morgan S. Blodgett*
ATTORNEY

United States Patent Office 3,570,194
Patented Mar. 16, 1971

3,570,194
WORKHEAD
Frederick A. Hohler, Holden, and Richard T. Knorring, Worcester, Mass., assignors to The Heald Machine Company, Worcester, Mass.
Filed Sept. 27, 1968, Ser. No. 763,295
Int. Cl. B24b 5/06
U.S. Cl. 51—215                    9 Claims

ABSTRACT OF THE DISCLOSURE

This invention relates to a workhead and, more particularly, to apparatus for holding workpieces in a machine tool, rotating them and providing for unloading finished workpieces and introducing an unfinished workpiece in its place.

BACKGROUND OF THE INVENTION

In the operation of machine tools, suitable progress has been made over the years in operating these machines automatically. The problem, however, of automatically unloading and loading the workpieces continues to be an impediment to complete automation. This is particularly true in the operation of internal grinding machines, especially where the workpieces are very small, as in the case of the races of miniature ball bearings. According to the most favored method of supporting these races, fixed carbide shoes are located at the so-called three o'clock and six o'clock positions. The three o'clock shoe resists the reaction of the abrasive wheel operating in the bore of the workpiece. The location of this three o'clock shoe is very important, therefore, in the determination of the ultimate bore diameter being ground. If the so-called "Sizematic" method of automatic grinding is used, it is imperative that the surface location of the three o'clock shoe be accurately maintained so that the resulting bore will have the proper finished diameter. Even if the so-called "Gage-matic" method is used, problems exist in supporting the workpiece so that marking of the surface does not take place, so that O.D. lobes are properly bridged, etc. However, fixing these shoes in their places presents another problem and that problem lies in the area of loading. Since the shoes occupy the optimum locations around the workpiece, the unloading of a finished workpiece and the introduction of a new unfinished workpiece has, in the past, been done only by use of very awkward mechanical constructions. These and other difficulties experienced with the prior art devices have been obviated in a novel manner by the present invention.

It is, therefore, an outstanding object of the invention to provide a workhead which is simple in construction and yet can be used in generating surfaces of revolution which are very accurately formed.

Another object of this invention is the provision of a workhead for an internal grinding machine in which the three o'clock shoe serves the function of a loading mechanism.

A further object of the present invention is the provision of a workhead for use in an automatic grinding machine wherein the workpieces can be unloaded and loaded very rapidly.

It is another object of the instant invention to provide a workhead which is simple and inexpensive in construction so that individual tooling for the workpiece may be provided for every distinct workpiece that is finished in the machine.

A still further object of the invention is the provision of a workhead which is rugged in construction and which is capable of a long life of useful service with a minimum of maintenance.

It is a further object of the invention to provide a workhead for an automatic grinding machine in which the workhead is designed so that certain elements can be readily changed to adapt the workhead for individual workpieces of particular size and shape.

With these and other objects in view, as will be apparent to those skilled in the art, the invention resides in the combination of parts set forth in the specification and covered by the claims appended thereto.

SUMMARY OF THE INVENTION

In general, the present invention involves a workhead for a machine tool for the generation of a surface of revolution on a workpiece, the machine tool having a housing, having a spindle mounted in the housing for rotation coaxially of the axis of the said surface of revolution and adapted to contact one end of the workpiece to rotate it, having a first support member for contacting a support surface of revolution of the workpiece at a point in line with the line of tool pressure, the support member being reciprocable along the said line. The machine tool also has a fixed support member for contacting the support surface at a point substantially removed from the first-mentioned point and has a chute for carrying a plurality of workpieces for introducing them into the said line when the said first support member has been reciprocated to its farthest position from the axis.

More specifically, the reciprocable support member is located on the end of an elongated finger extending in the direction of the pressure line and the finger extends at a right angle to one end of an arm whose other end is pivoted for swinging movement about an axis parallel to the spindle axis. An escapement member is connected to and swings with the arm into the chute to release the workpieces one at a time into the path of reciprocation of the finger. A resilient pressure element is mounted on the housing for engagement with the workpiece at a position on the external surface of the workpiece located 90° away from the support shoe.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
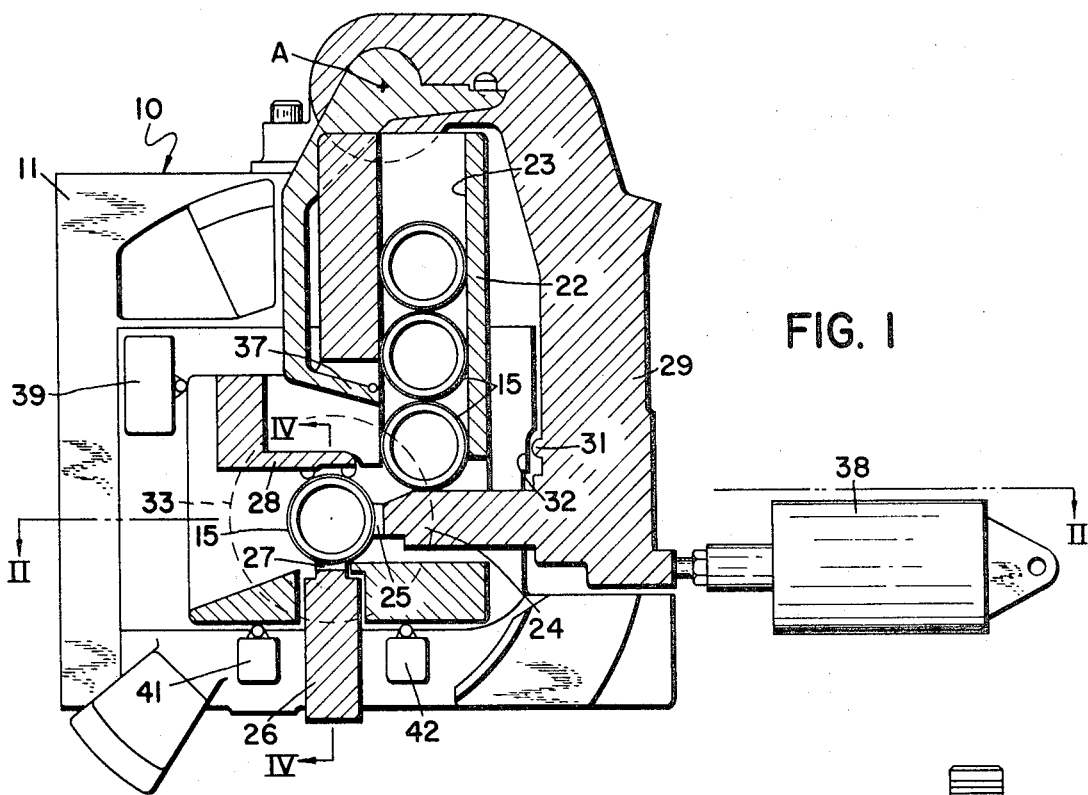
FIG. 1 is a vertical sectional view of a workhead embodying the principles of the present invention taken on the line I—I of FIG. 2.
Figure 2:
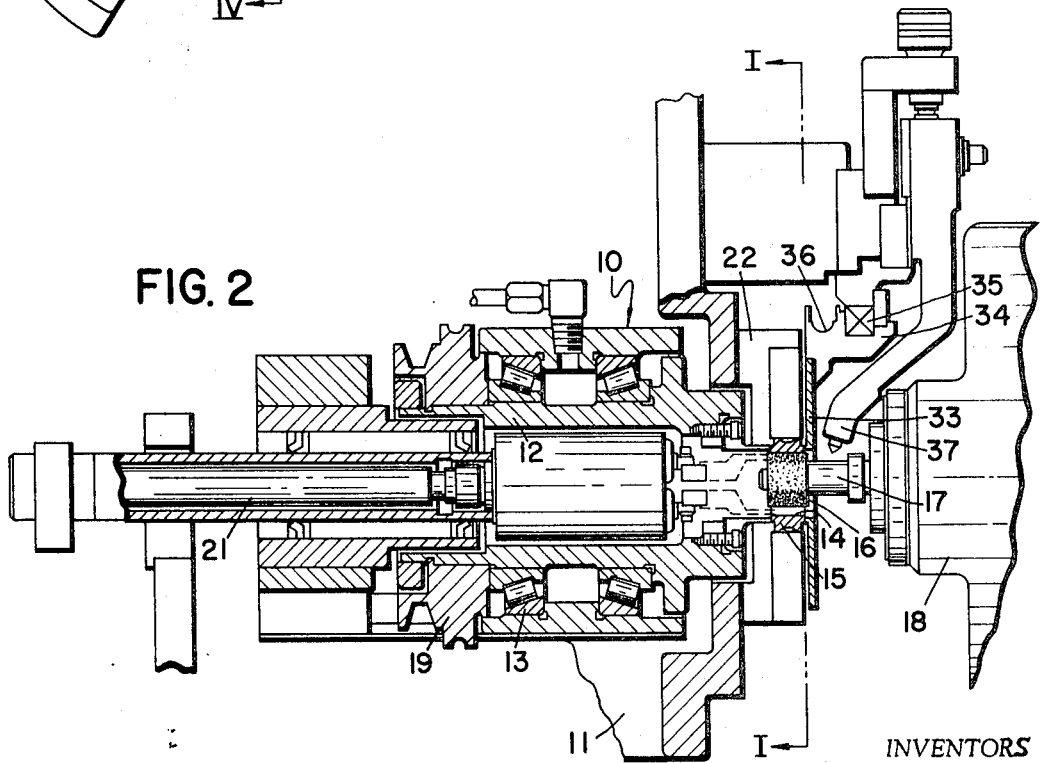
FIG. 2 is a horizontal sectional view of the workhead taken on the line II—II of FIG. 1.

Referring first to FIGS. 1 and 2, which best show the general features of the invention, the workhead, indicated generally by the reference numeral 10, is shown as being of the type used in a machine tool for the generation of a surface of revolution on a workpiece and, more specifically, is shown as a workhead for use in a grinding machine for the generation of an internal surface of revolution. The workhead is shown as having a housing 11 in which is rotatably mounted a spindle 12. A suitable roller bearing 13 supports the spindle for rotation coaxially of the axis of a bore 14 in a workpiere 15. For the purpose of illustration, the workpiece 15 is shown as being the inner race of a ball bearing. The surface 14 is to be finished by an abrasive wheel 16 mounted on the outer end of a spindle 17 which, in turn, is rotatably mounted and driven by a wheelhead 18. The workhead 10 and the wheelhead 18 form the components of an internal grinding machine designed for automatic operation; such a machine is shown in the copending patent application of Uhtenwoldt Ser. No. 763,294, filed Sept. 27, 1968.

The other end of the spindle is provided with a pulley 19 by which it is driven in the usual way. Inside the spindle is mounted a gage 21 which will be described more fully hereinafter. Mounted on the front of the housing is a chute 22 having a vertical slot 23 in which the workpieces 15 are loaded. A first support member 24 having mounted on it a carbide shoe 25 contacts the workpiece 15 at the three o'clock position. A fixed support member 26 is provided with a carbide shoe 27 which contacts the outer surface of the workpiece 15 at the six o'clock position. A resilient element 28 is mounted on the housing and is provided with two spaced contacts which engage the workpiece 15 in its upper portion at approximately the eleven o'clock and one o'clock positions.

The first support member 24 is reciprocable along a horizontal line passing through the axis of the workpiece and extending in the three o'clock direction. More specifically, this support is reciprocable along the pressure line from an operative position in contact with the workpiece to an inoperative position located a substantial distance away from the workpiece. The support member 24 is an elongated finger which extends in the direction of the pressure line and extends at a right angle to a vertical arm 29 whose other end is pivoted about the axis A which is parallel to the spindle axis. A contact element 31 on the arm engages a stop 32 on the housing, so that the shoe is returned very accurately to the said operative position.

A clamping plate 33 engages the other end of the workpiece 15 from the spindle and maintains it in engagement with the spindle which, incidentally, has an annular nose for driving contact with the adjacent radial end surface of the workpiece. The clamping plate is mounted for movement along the spindle axis in a co-axial ring 34 which, in turn, is mounted in a bearing 35 for rotation. The ring is provided with an annular groove 36 by which it is driven (in a manner not shown, but which is well known in the art) by the same motor which drives the pulley 19 of the spindle 12. Air pressure is used to press the clamping plate 33 relative to the ring 34 to press the workpiece 15 against the end of the spindle. The ring 34 is suitably formed to allow the dressing apparatus 37 to operate. Swingable with the arm 29 is an escapement member 37. This member swings into the slot 23 of the chute 22 to release the workpieces one at a time into the path of reciprocation of the support 24. An air cylinder 38 operates to swing the arm 29 with the shoe 25.

Figure 3:
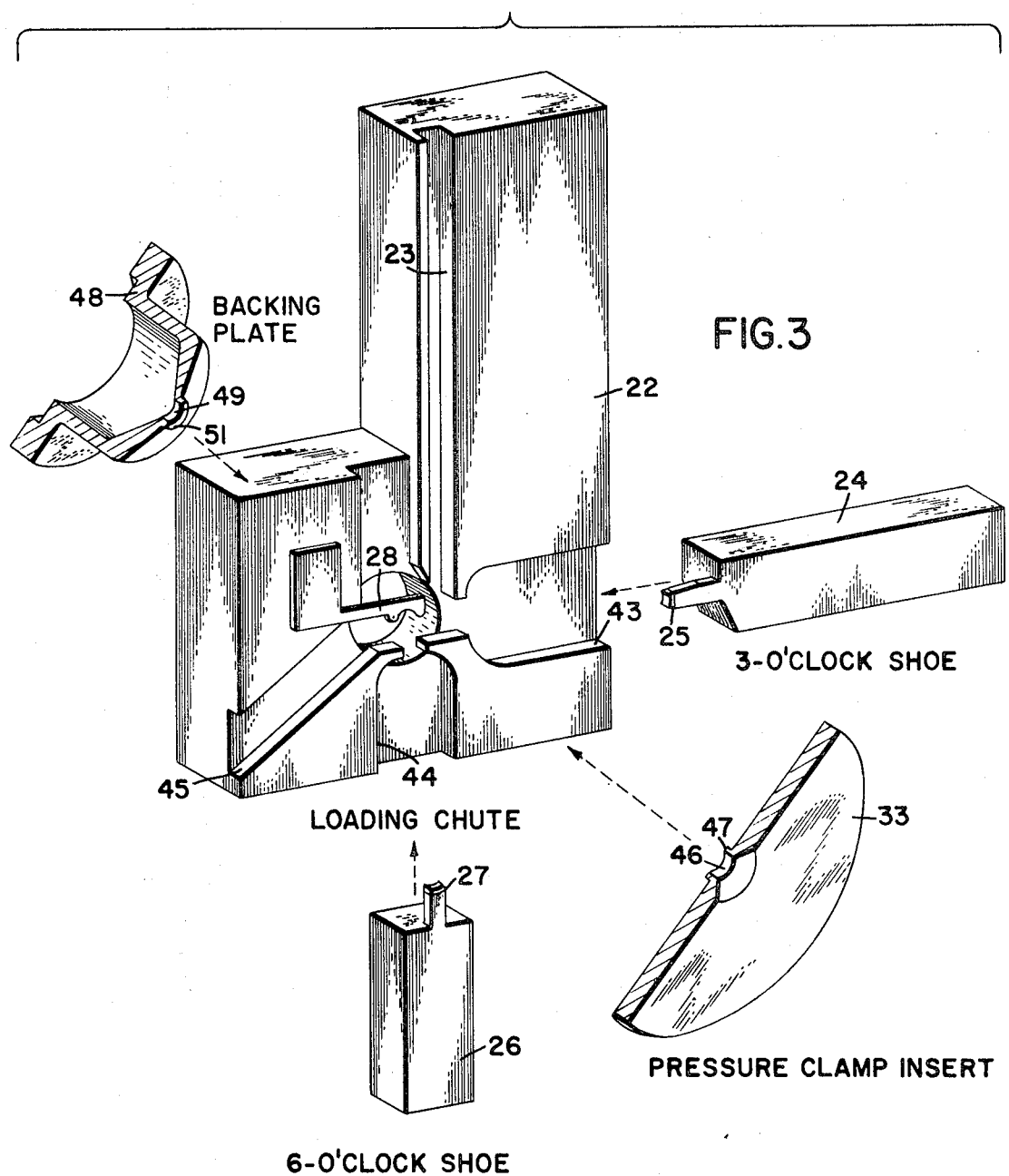
FIG. 3 is an exploded view of changeable tooling associated with the workhead.

Referring next to FIG. 3, which shows the so-called "tooling" associated with the workhead, it can be seen that the chute 22 is carved from a single block of metal and is mounted on the housing (referring to FIG. 1) by means of locating blocks 39, 41, and 42. It has a slot 43 adapted to receive the support 24, a slot 44 to receive the support 26, and an inclined slot 45 down which the finished workpieces 15 pass after the grinding operation is over. As is evident in this figure, the clamping plate 33 has a central circular aperture 46 through which the abrasive wheel 16 passes and the edge of this aperture is provided with an annular lip 47 adapted to engage the end of the workpiece. This figure also shows the construction of a backing plate 48 which is bolted to the end of the spindle 12. This also has a circular aperture 49 through which the gage 21 can operate and an annular lip 51 which engages the end of the workpiece. All of these are special elements or tooling made up for an individual size and shape of workpiece and would be dismounted when another workpiece is to be machined on the grinding machine and replaced with another similar set especially sized for the new workpiece.

Figure 4:
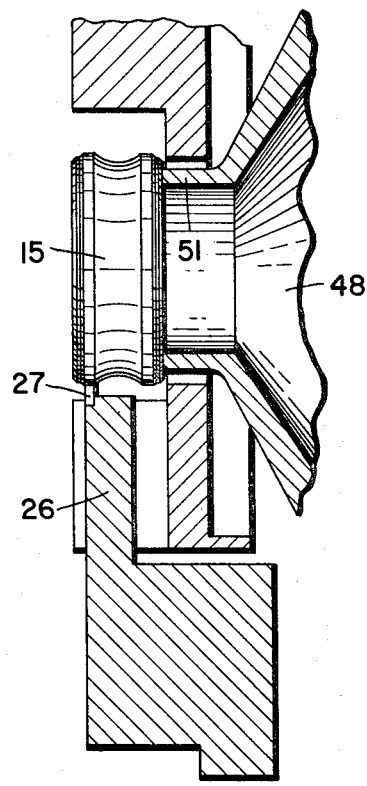
FIG. 4 is a vertical sectional view of a portion of the invention taken on the line IV—IV of FIG. 1.

FIG. 4 shows the way in which the inner bearing race 15 is supported on the carbide shoe 27 of the support 26 and driven by the backing plate 48.

Figure 5:
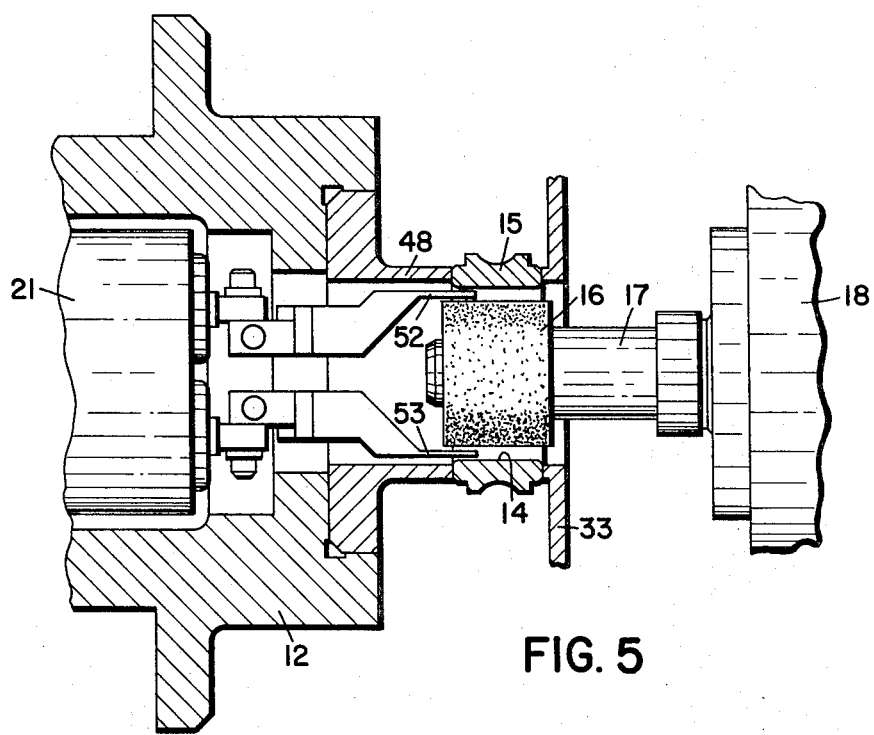
FIG. 5 is a vertical sectional view of the workhead showing a gage in operation.

In FIG. 5 it can be seen that the gage 21 is provided with two resilient fingers 52 and 53 which engage the surface 14 of the workpiece 15 at the 6- and 12-o'clock positions, so that it is possible to carry on the grinding operation with the wheel 16 and, at the same time, continuously gage the surface. These measurements are measured by the gage and transmitted to the machine controls for regulating changes in the cycle and, of course, the finish size.

The operation of the invention will now be readily understood, in view of the above description. The automatic grinding machine is placed in operation in the usual way. The slot 23 of the chute 22 is filled with workpieces 15 and the cycle begins. With one workpiece in place in contact with the shoes 25 and 27, the grinding wheel 16 is brought into contact with the surface 14 of the workpiece and grinds it to finish size, as determined by the gage 21. When the workpiece is finished, a suitable signal is given to the pneumatic cylinder 38 and this draws the arm 29 rearwardly along with the support member 24 and the shoe 42. At the same time, it swings the escapment member 37 inwardly so that it lies under the second workpiece 15 in line. The first workpiece in the slot, however, falls downwardly in front of the shoe 25 when the arm 27 has reached its rearwardmost portion, but the second one in line is prevented from falling downwardly by the escapement member 37. The cylinder 38 is then reversed and the shoe 25 in its travel to the left strikes the workpiece and pushes it into the work position. Also, at the same time, it is pushing the finished workpiece down the slot 45. When the workpiece reaches the position under the two contact buttons on the resilient element 28, it is located in engagement with the shoe 27 and the shoe 25 has reached its carefully selected operative position, as determined by the contact between the contact element 31 and the stop 32. It can be seen, then, that the repeatability of the position of the shoe 25 is excellent and that the workpieces are introduced in a positive manner into the work area. Naturally, while the unloading and loading of the workpieces takes place, the clamping plate 33 is relieved of the air pressure so that it returns to a position slightly inwardly of the ring 34, but once the new workpiece is in place against the shoe, air pressure is introduced to press the clamping plate toward the workpiece, so that the workpiece is clamped between the backing plate 48 of the spindle 12 and the clamping plate 33. When a large number of workpieces has been finished with this apparatus and it is desired to operate with a new type of workpiece, it is a simple matter to remove the tooling elements including the chute, the support 24, the support 26, the backing plate 48, and the clamping plate 33 and replace them with special shoes designed for the new workpiece. This means that, although most of the expensive portion of the workhead remains behind, it is used over and over again and the elements which come in contact with the workpiece can be specially designed for that particular workpiece.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A workhead for a machine tool for the generation of a surface of revolution on a workpiece comprising
   (a) a housing,
   (b) a spindle mounted in the housing for rotation coaxially of the axis of the said surface of revolution and adapted to contact one end of the workpiece and rotate it also, (c) a first support member for contacting another surface of revolution of the workpiece at a point in line with the line of tool pressure, the support member being reciprocable along the said line, (d) a fixed support member for contacting the last-named surface at a location substantially removed from the first-mentioned point, and (e) a chute for carrying a plurality of workpieces for introduction into the said line, between the point occupied by the said first support member in its nearest position to the axis and the point occupied by the said first support member in its farthest position, when the said first support member has been reciprocated to its farthest position from the axis.

2. A workhead for use in a grinding machine for the generation of an internal surface of revolution on a workpiece, comprising (a) a housing, (b) a spindle mounted in the housing and driven for rotation coaxially of the axis of the surface, the spindle having an annular nose for driving contact with a radial end surface of the workpiece, (c) a support shoe for contacting an external surface of revolution of the workpiece at a portion thereof on the line of abrasive wheel pressure, the support shoe being reciprocable along the line from an operative position to an inoperative position located a substantial distance from the workpiece, (d) a stop determining the said operative position, and (e) a chute for carrying a plurality of workpieces in a line at right angles to the line of pressure and having a discharge end located between the axis and the shoe when the shoe is in the inoperative position.

3. A workhead as recited in claim 2, wherein an elongated finger is provided extending in the direction of the pressure line and on which the said shoe is located, and wherein an arm is provided having an end pivoted for swinging movement about an axis parallel to the spindle axis, the finger extending at a right angle to the other end of the arm.

4. A workhead as recited in claim 3, wherein a contact element is provided on the said arm, the contact element engaging said stop so that the shoe is returned very accurately to the said operative position.

5. A workhead as recited in claim 4, wherein a clamping plate is provided for engagement with another radial end surface of the workpiece to maintain it in engagement with the spindle.

6. A workhead as recited in claim 5, wherein a driven coaxial ring is mounted in the housing and said clamping plate is mounted for movement along the spindle axis in the coaxial ring and is driven thereby.

7. A workhead as recited in claim 6, wherein a fork-type gage is provided and is continuously operative in the workpiece during grinding, the gage being mounted in the spindle and entering the workpiece from the spindle end.

8. A workhead as recited in claim 7, wherein a resilient element is mounted on the housing for engagement with the workpiece at a position on the external surface of the workpiece located 90° away from the support shoe.

9. A workhead as recited in claim 3, wherein an escapement member is connected to and swings with the arm into the chute to release the workpieces one-at-a-time into the path of reciprocation of the finger.

References Cited

UNITED STATES PATENTS

| 2,635,395 | 4/1953 | Arms et al. | 51—236X |
| 2,758,427 | 8/1956 | Quimby | 51—236X |
| 2,818,687 | 1/1958 | Quimby | 51—236X |
| 3,089,291 | 5/1963 | Humes et al. | 51—103 |

OTHELL M. SIMPSON, Primary Examiner

U.S. Cl. X.R.

51—105, 236